Feb. 25, 1936.   L. H. BOGART   2,031,999
TANK GAUGE
Filed March 28, 1934   4 Sheets-Sheet 4

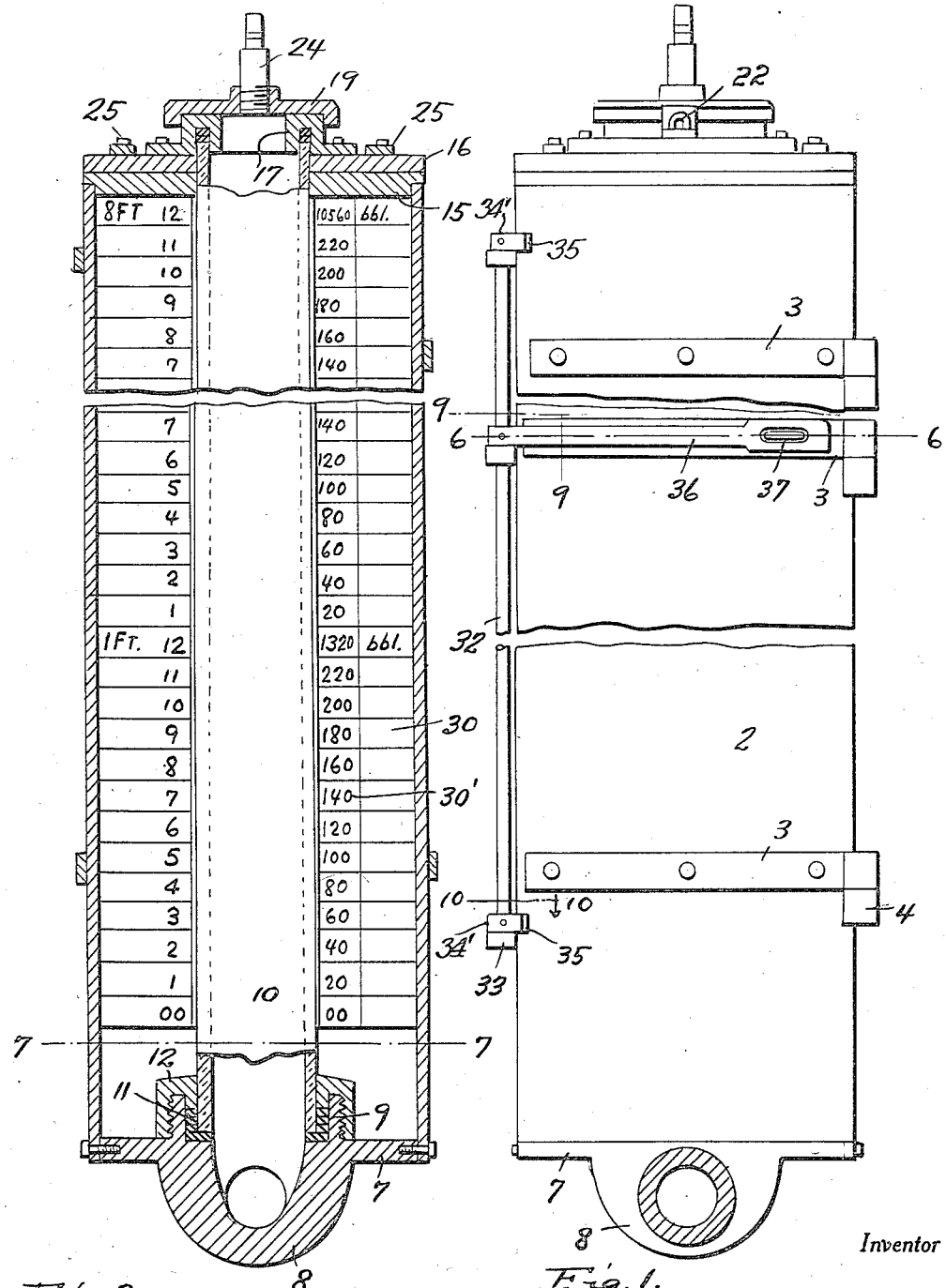

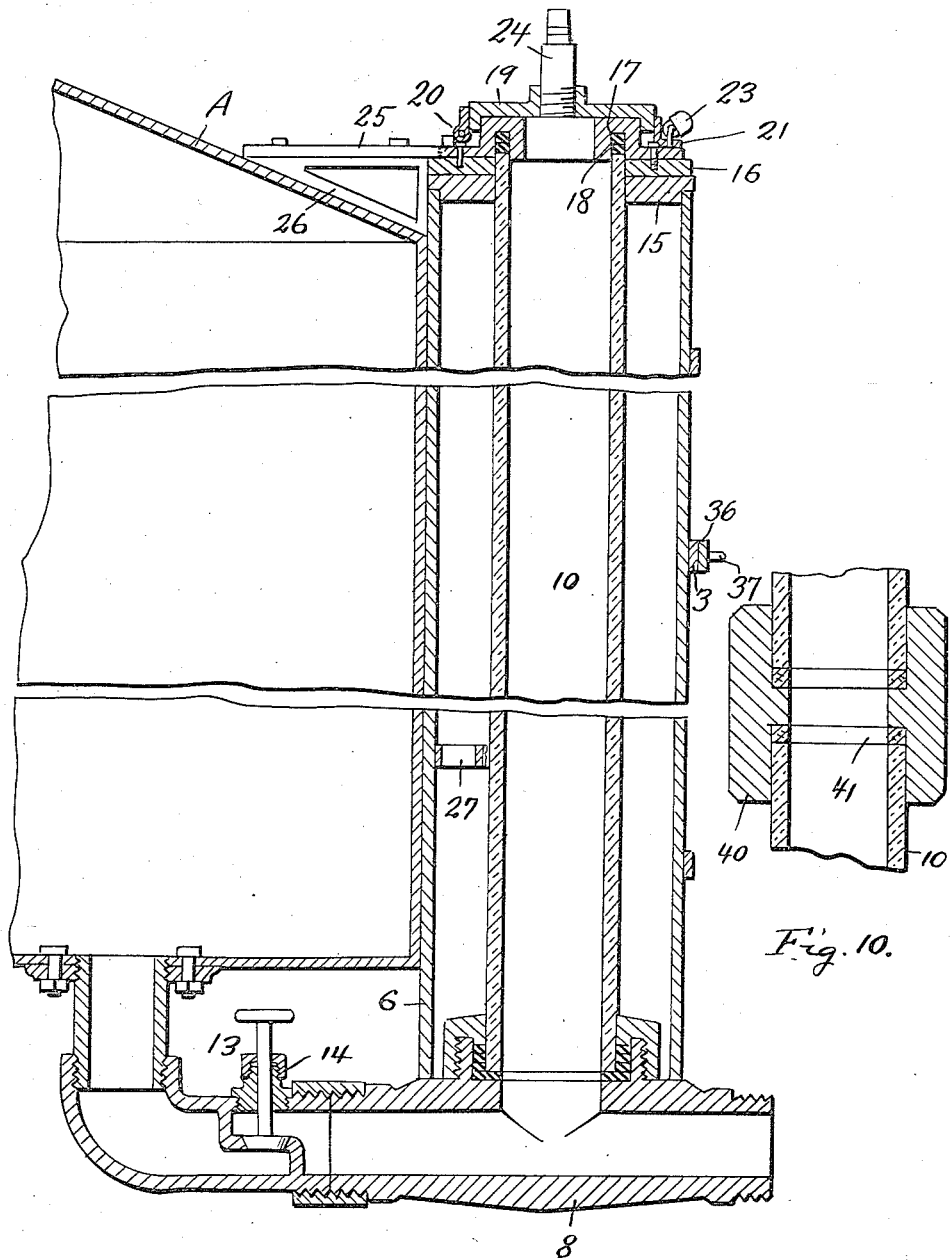

Inventor
L. H. Bogart
By Clarence A. O'Brien
Attorney

Patented Feb. 25, 1936

2,031,999

UNITED STATES PATENT OFFICE 2,031,999

TANK GAUGE

Leonard H. Bogart, Comanche, Okla.

Application March 28, 1934, Serial No. 717,862

1 Claim. (Cl. 73—54)

This invention relates to a gauge for a tank, the general object of the invention being to provide means whereby the contents of a tank can be checked from top to bottom by an operator standing on the ground so that the annoyance and hazard of the operator climbing to the top of the tank are eliminated.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a front view of the device.

Figure 3 is a section on line 3—3 of Figure 2.

Figure 4 is a vertical sectional view through the device and a part of the tank.

Figure 11 is a view showing means for connecting two sections of the tube together.

Figures 2, 8, 9, 10:
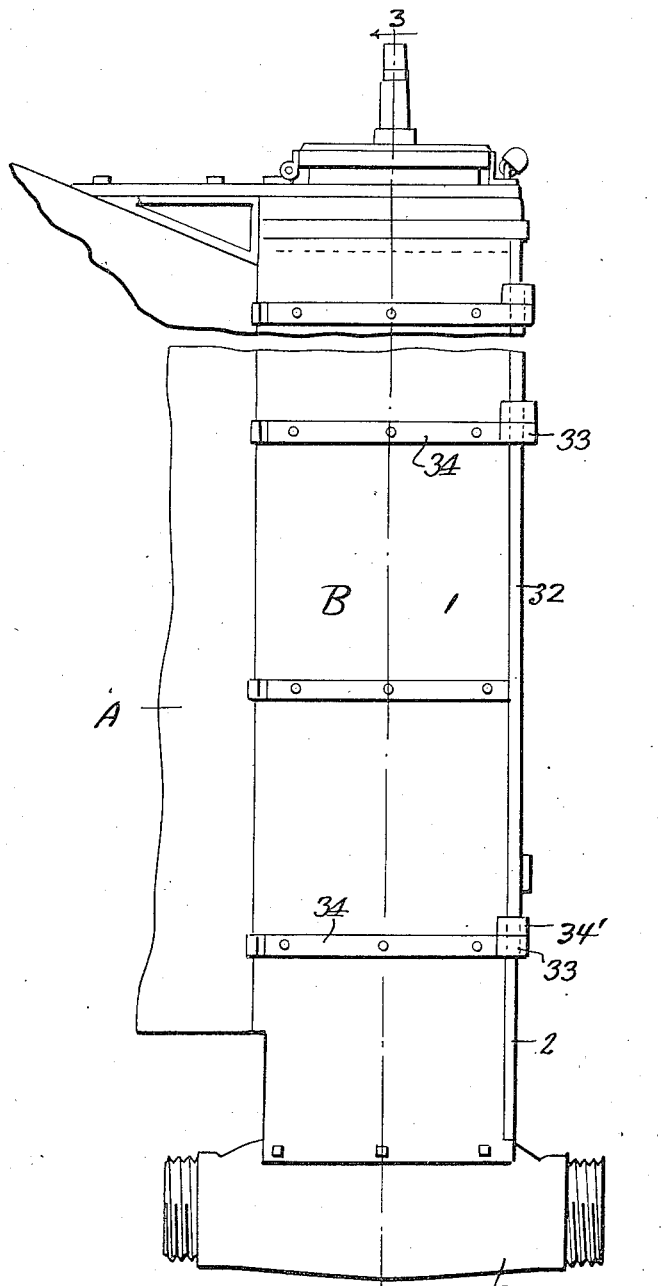
Figure 2 is a side view showing the same attached to a tank.
Figure 8 is a fragmentary view of the upper end of the rod and its supporting bracket.
Figure 9 is a section on line 9—9 of Figure 1.
Figure 10 is a section on line 10—10 of Figure 1.
Figure 5:
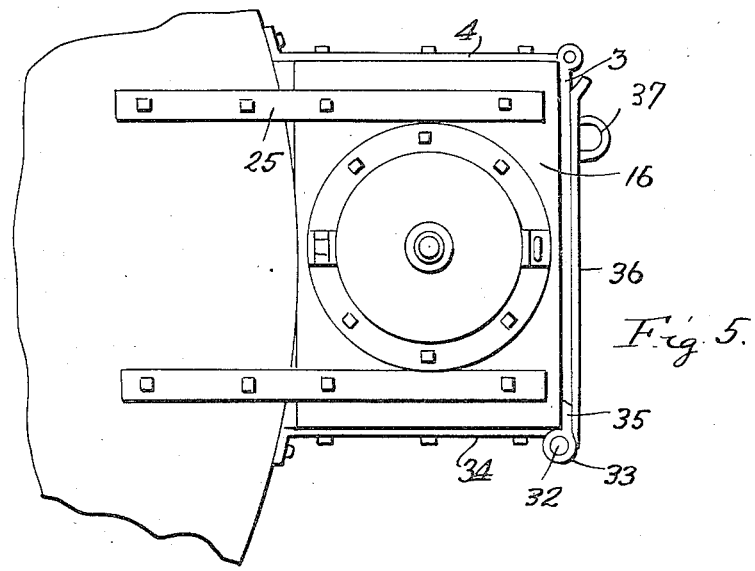
Figure 5 is a top plan view of Figure 4.

In these drawings, the letter A indicates a tank and the letter B indicates the casing of the device which includes the sides 1 and the front door 2, the hinges of which consist of the bars 3 fastened to the door and the bars 4 fastened to one of the sides 1, the adjacent ends of the two sets of bars being rolled to form barrels for receiving the hinge pins 5.

The back of the casing is shown at 6. The lower end of the casing extends below the bottom of the tank and is fastened to a base 7 which is formed with a horizontally arranged tubular part 8 and with a flange 9 into which fits the lower end of the gauge tube 10, a packing 11 enclosing the lower end of the tube and being held in place by a nut 12. The inner end of the tubular part 8 is connected to the bottom of the tank, as shown generally at 13, and this connection is provided with a valve 14. The front end of the tubular part is threaded so as to receive a closing cap.

The upper end of the casing is closed by a member 15 to which a plate 16 is connected and a packing gland 17 is connected to this plate, the packing of which is shown at 18. A cap 19 is hinged to these parts, as shown at 20, and has a latch part 21 thereon for passing over a keeper member 22 for receiving a padlock 23. The cap is provided with a vent 24.

Members 25 are connected to the upper part of the casing and are bolted to a bracket 26 fastened to the top of the tank. The upper end of the tube, of course, extends into the packing gland 17, as shown.

A yoke-shaped member 27 is located in the inner part of the casing and has a substantially semi-circular central portion 28 for receiving a part of the tube 10, a gasket 29 being located between the semi-circular part and the tube and plates 30 being fastened to the front side walls of the member 28 and having flanges at their inner ends, as shown at 31, for holding the tube in the part 28. These plates carry the scales 30' as shown in Figure 3.

Figure 6:
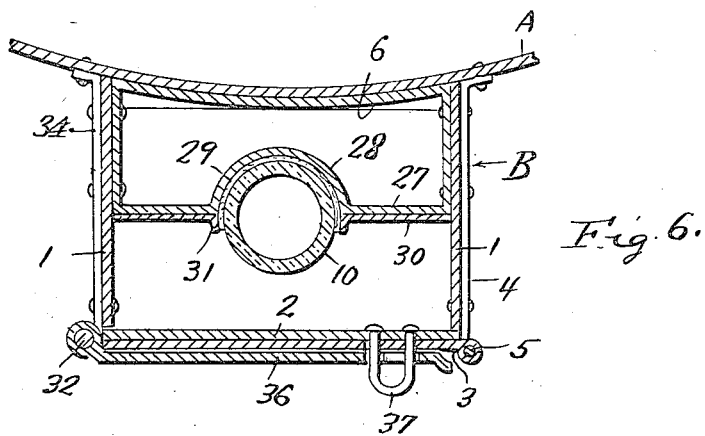
Figure 6 is a section on line 6—6 of Figure 1.
Figure 7:
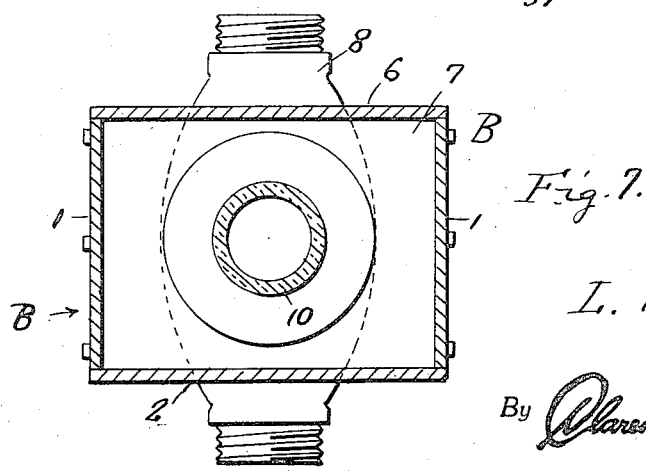
Figure 7 is a section on line 7—7 of Figure 3.

A vertically arranged rod 32 is rotatably supported by eyes 33 formed on the bars 34 fastened to the left side of the casing and collars 34' are pinned to the rod and have lugs 35 thereon for engaging the door for holding the same closed when the rod is turned to a certain position. The rod is held in this certain position by a bar 36 fastened to the rod at one end and having a keeper receiving opening in its other end for receiving a staple 37 carried by one of the hinge bars 3, the staple being adapted to receive a padlock or the like so as to hold the door of the casing in closed position. The inner ends of the bars 34 can be riveted to the tank, as shown in Figure 9, and the hinge bars 4 may also be fastened at their inner ends to the tank, as shown in Figure 6.

When the tube is of considerable length, a number of sections may be used and these sections connected together by the splicing sleeves 40 and the gaskets 41.

Thus it will be seen that the liquid in the tank will find its level in the tube 10 and this level can be ascertained by opening the front door and observing the graduations of the scales opposite the level of liquid in the tube.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

In combination with a tank, a vertically arranged casing supported at a side portion thereof and having its lower end extending below the bottom of the tank, said casing having its front open, a door for closing said front, a bottom member for the lower end of the casing and having a horizontally arranged tubular part thereon and a vertically arranged opening passing from the bore of the tubular part to the upper face of the bottom member, means containing a valve for connecting the tubular part with the bottom of the tank, a transparent tube supported in the casing and vertically arranged therein, the lower end of the tube being in communication with the opening in the bottom member, packing means carried by the bottom member for the lower end of the tube, a top member for the casing having an opening therein in which extends the top of the tube, packing means for the top of the tube, and bars connecting the upper closure member with the top part of the tank, the upper part of said top closure member having an opening therein in communication with the tube, a cap for closing the opening and hinged to the top member, means for locking the cap in closing position, a gauge strip vertically arranged in the casing and located adjacent the tube, and means for holding the door in closed position.

LEONARD H. BOGART.